Jan. 15, 1946.    R. A. CRAWFORD    2,392,902
FUEL TANK
Filed Aug. 23, 1939
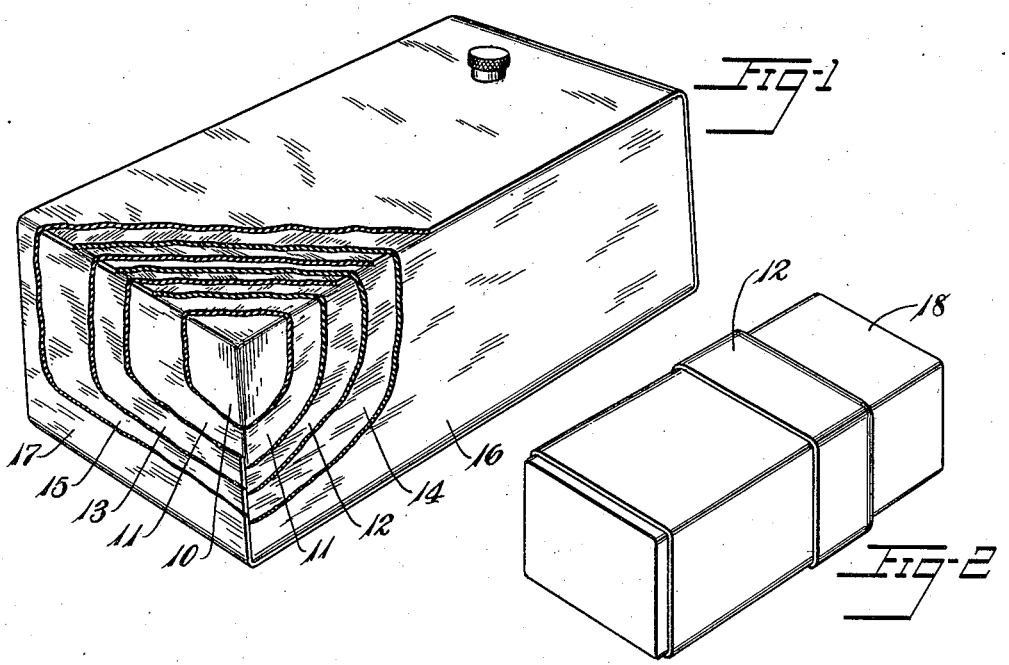
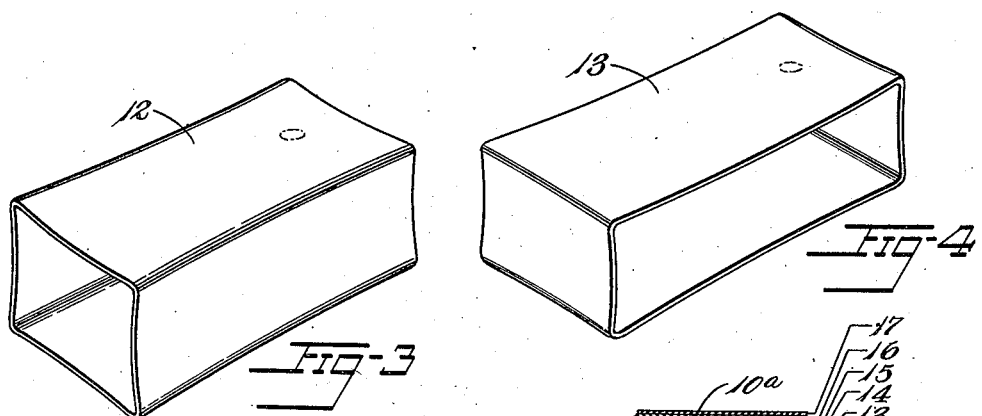
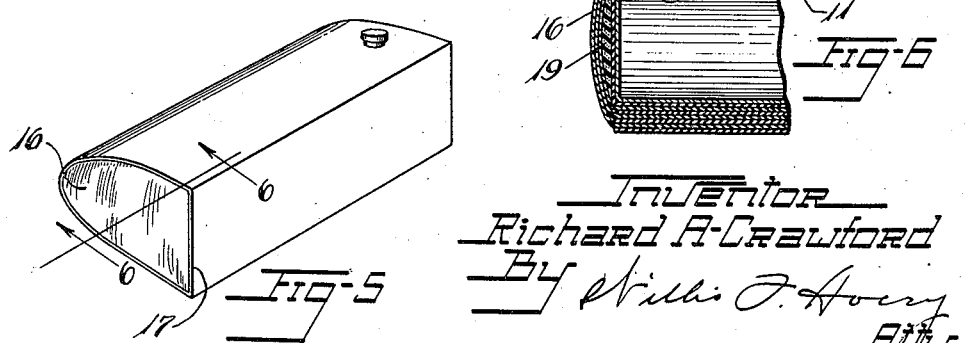
Inventor
Richard A. Crawford
By Willis J. Avery
Atty.

Patented Jan. 15, 1946

2,392,902

UNITED STATES PATENT OFFICE 2,392,902

FUEL TANK

Richard A. Crawford, Akron, Ohio, assignor to The B. F. Goodrich Company, New York, N. Y., a corporation of New York Application August 23, 1939, Serial No. 291,540

1 Claim. (Cl. 154—43.5)

This invention relates to fuel tanks and particularly to fuel tanks of the so-called "leak-proof" or "bullet-proof" type designed especially for use in aircraft and other motorized craft and vehicles subjected to gun fire during warfare.

A great deal of research work and experimentation has been carried on by many investigators with the view of providing a fuel tank which will seal itself and prevent the escape of any substantial quantity of fuel when the tank is punctured as by a bullet in order that the fire hazard and loss of fuel ordinarily accompanying such puncture of aeroplane fuel tanks and the like may be eliminated. Notwithstanding such intensive efforts over an extended period of time, no really satisfactory "leak-proof" or "bullet-proof" tank has been designed heretofore.

It is accordingly the principal object of the present invention to provide a simple, inexpensive, light-weight and easily constructed "leak-proof" or "bullet-proof" fuel tank having satisfactory self-sealing characteristics, and to provide a novel method of making such a fuel tank.

In the present invention, a conventional fuel tank may be utilized. The tank may be formed of any suitable rigid material but desirably should be made of soft, ductile metal or metal alloy in order that deformation of the tank walls accompanying puncture by a bullet may be minimized. The tank is enveloped by a sealing layer preferably applied directly to the tank and comprising a plastic material flowable under compressive forces for closing a bullet puncture in the layer. Overlying the sealing layer are provided a plurality of compressive layers adapted to apply compressive forces to the sealing layer for forcing flow of the sealing material and thereby closing a puncture. The various compressive layers are so prepared and arranged, in the manner herein-after more fully described, that the compressive forces applied by the individual layers increase in magnitude from the inner layers outward. Additionally, some of the compressive layers are themselves under internal compression. The various covering layers may or may not be adhered together, but it is believed that more satisfactory sealing is achieved when the layers are not adhered together but are free to move relatively with respect to one another. In order that the various compressive layers may function with maximum effect upon the sealing layer, no inextensible elements of fabric or similar materials should be interposed between the various layers of the covering. In fact, it is preferable to exclude inextensible elements entirely in order that the covering may be freely extensible throughout, but the inclusion of relatively non-extensible elements is not prohibited in positions where they will not interfere with the functioning of the sealing and compressive layers, as, for example, outside all the layers.

The sealing layer may comprise any of a variety of flowable plastic sealing materials. Compositions having unvulcanized rubber as a principal ingredient are quite satisfactory for this purpose. Such unvulcanized rubber compositions desirably, although not necessarily, may contain from 5 to 10 parts by weight of a rubber softening material such as light mineral oil for increasing the plasticity and flowability of the layer. It is also desirable to reduce the tendency of the unvulcanized rubber to dissolve in common liquid fuels such as gasoline, without reducing its swelling tendency, by incorporating in the unvulcanized rubber a substantial quantity of a synthetic rubber-like material having the property of resisting solution in the fuel. Examples of such materials are the commercial product known as "Buna N" which is understood, but not positively known, to be a copolymer prepared by polymerizing a mixture of approximately 85% butadiene and 15% acrylic nitrile; and the commercial product known as neoprene which is, chemically, a chloroprene. The incorporation of around 50% by weight of such materials in the unvulcanized rubber sealing composition produces superior results although greater or lesser quantities may be used with satisfactory results. "Buna N" appears to be somewhat more effective than neoprene for this purpose.

The various compressive rubber layers may be formed of any high grade vulcanized rubber composition such as a high grade composition used in making inner tubes for automobile tires. The compressive layers likewise may be improved by incorporating fuel-resisting synthetic rubber-like materials of the character and in the quantities hereinabove indicated in connection with the unvulcanized rubber sealing composition.

It has been found that rubber compositions containing 50% by weight of "Buna N" are not dissolved by gasoline and similar fuels to any appreciable extent. When such compositions are vulcanized, they are not substantially attacked in any manner by such fuels. When not vulcanized, the compositions swell rapidly but still do not dissolve in gasoline and the like. As has been indicated, these facts are utilized in the present invention by employing in the sealing layer an unvulcanized mixture of rubber and synthetic fuel-resisting material which will swell but will not dissolve in gasoline and employing in the compressive layers a similar mixture in the vulcanized state which is not substantially attacked in any manner. Thus the unvulcanized sealing material surrounding a puncture is swollen rapidly upon contact with the fuel and such swelling assists and accelerates sealing of the puncture by compressive flow of the sealing material. At the same time, the application of compressive forces is not interfered with, as the vulcanized compressive layers successfully resist attack by the gasoline.

Specific embodiments illustrative of the invention will now be described with reference to the accompanying drawing, of which:

Fig. 1 is a perspective view of a "leak-proof" fuel tank embodying the principles of the present invention, the various covering layers being broken away for clarity of illustration;

Fig. 2 is a perspective view illustrating a step in the manufacture of the fuel tank of Fig. 1 and showing particularly the step of molding and reversing a rubber sleeve to be placed on the tank;

Fig. 3 is a perspective view of a transverse rubber sleeve prepared as shown in Fig. 2 and ready for application to the tank;

Fig. 4 is a perspective view of a longitudinal rubber sleeve ready for application to the tank;

Fig. 5 is a perspective view of a tank having a somewhat more complicated configuration and embodying the present invention;

Fig. 6 is a fragmentary section taken on line 6—6 of Fig. 5.

For simplicity of illustration and ease of description, the invention has been shown in Figs. 1 to 4 as applied to a conventional fuel tank 10 having a simple rectangular configuration. The tank 10 is first provided with an enveloping layer of sealing material 11 applied directly to the tank. The sealing layer 11 may be prepared by mixing the ingredients hereinabove set forth on a conventional rubber mill and then calendering the mixture to produce a sheet which ordinarily may be from 0.10 to 0.25 inch thick. The sheeted material is then placed about the tank 10 to provide the enveloping coating and sealing layer 11, rubber cement or other adhesive being employed, if necessary, to hold the layer 11 in place on the tank 10.

Next, a plurality of compressive layers of vulcanized rubber composition are pre-molded and then positioned on the tank, over the sealing layer 11, soapstone or similar adhesion-preventing material being applied to the layer 11 and to successive compressive layers to facilitate positioning of the layers and to prevent adhesion between the layers. The compressive layers ordinarily will be from 0.09 to 0.15 inch thick. Such compressive layers are most conveniently provided by molding separate annular sleeves adapted to be fitted about the tank, transversely and longitudinally of the tank, a transversely extending sleeve and a longitudinally extending sleeve constituting a complete covering layer for the tank. Such sleeves preferably are pre-molded on a mandrel 18 having substantially the size and configuration of the tank 10. When a plurality of such pre-molded sleeves of the same size and configuration are superposed, the outer sleeves will be stretched more than the inner sleeves and the compressive forces applied by the sleeves will therefore increase progressively from the inner sleeves outward. Such a condition of progressively increasing compression appears to contribute materially to the success of the present invention.

Additionally, it has been found desirable to place a face of an inner compressive layer under internal compression. Thus, the annular sleeves comprising the first compressive layer, namely the transversely extending sleeve 12 and the longitudinally extending sleeve 13, are molded on the mandrel 18 but are only partially vulcanized on the mandrel. The partially vulcanized annular sleeves then are reversed, as during the stripping operation as shown in Fig. 2, to produce partially vulcanized, pre-molded sleeves 12 and 13 as shown in Figs. 3 and 4, having their side walls bowed inward and their inner faces under internal compression as a result of the reversal. The partially-vulcanized and reversed sleeves 12 and 13 then are placed about the tank 10 in transverse and longitudinal directions, respectively, and the vulcanization of the rubber is completed while the sleeves are in place on the tank.

The remaining compressive layers comprising the transversely-extending sleeves 14 and 16 and the longitudinally extending sleeves 15 and 17 are then applied, these sleeves preferably being fully vulcanized on the mandrel 18 and preferably being removed and applied to the tank 10 without being reversed. The transverse and longitudinal sleeves, of course, are applied alternately.

Suitable openings may be cut in the sleeves to accommodate filler pipes or other parts as indicated in the drawing.

When the fuel tank has a more complicated configuration such as that of a semi-elliptical cylinder as in the tank 10a illustrated in Figs. 5 and 6, some difficulty may be encountered in obtaining a satisfactory condition of substantially uniform compression over certain portions of the tank surface as for example at the flat ends of the tank 10a shown in Fig. 5. In such cases it will be found desirable to insert a spongy resilient filler, such as a filler 19 of ordinary sponge rubber, so shaped that its external surface is convex, between two of the covering layers and preferably between the sealing layer 11 and the overlying compressive layers. Such a spongy filler, because of its convexity, effectively maintains a condition of substantially uniform compression throughout the covered area and this expedient is especially useful in connection with the covering of reversely curved surfaces such as the surfaces encountered in tanks designed to fit inside wing structures of aeroplanes.

Firing tests conducted upon fuel tanks embodying the present invention indicate that the structure hereinabove set forth is unusually effective in securing quick and efficient sealing of bullet holes in the tanks and that such tanks may be subjected to gun fire without substantial leakage of fuel occurring.

Numerous modifications and variations in details of the structures, materials, and procedures hereinabove described may be made without departing from the spirit and scope of the invention as defined by the appended claim.

I claim:

A container for liquid fuel comprising, in combination, a rigid tank and a covering for the tank adapted to seal the container against substantial leakage of fuel when punctured as by a bullet, said covering comprising a sealing layer of flowable, plastic material comprising unvulcanized rubber and a synthetic rubber-like material which is insoluble in hydrocarbon fuels and, superposed upon the sealing layer, a compressive layer of non-plastic, elastic and resilient material comprising vulcanized rubber and a synthetic rubber-like material which is insoluble in hydrocarbon fuels.

RICHARD A. CRAWFORD.